United States Patent
Taniguchi et al.

(10) Patent No.: US 7,400,141 B2
(45) Date of Patent: Jul. 15, 2008

(54) MAGNETIC TYPE ANGLE SENSOR

(75) Inventors: Mitsuyuki Taniguchi, Gotenba (JP);
Keisuke Imai, Fujikawaguchiko-machi
(JP); Ichirou Nagatomo, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/709,248

(22) Filed: Feb. 22, 2007

(65) Prior Publication Data

US 2007/0152661 A1     Jul. 5, 2007

Related U.S. Application Data

(62) Division of application No. 11/156,492, filed on Jun. 21, 2005, now abandoned.

(30) Foreign Application Priority Data

Jun. 24, 2004    (JP) .............. 2004-186276

(51) Int. Cl.
*G01B 7/30* (2006.01)
*B21D 53/28* (2006.01)
*B23F 1/00* (2006.01)

(52) U.S. Cl. .............. 324/207.25; 324/207.22; 29/893.3; 29/893.35; 409/10; 409/15

(58) Field of Classification Search ............ 324/207.22, 324/207.25; 29/893.3, 893.35; 409/10, 15
See application file for complete search history.

(56) References Cited

U.S. PATENT DOCUMENTS

| 4,833,405 A | * | 5/1989 | Richards et al. ........ 324/207.22 |
| 4,835,505 A | * | 5/1989 | Hattori et al. .............. 335/302 |
| 5,345,909 A | | 9/1994 | Fukui et al. |

2005/0168091 A1 * 8/2005 Miya .................. 310/168

FOREIGN PATENT DOCUMENTS

| EP | 0 539 602 A1 | 5/1993 |
| EP | 0 663 595 A2 | 7/1995 |

(Continued)

OTHER PUBLICATIONS

English Translation of JP01050910A / JP64-50910A, 7 pages, Jun. 28, 2006.*

(Continued)

*Primary Examiner*—Patrick Assouad
*Assistant Examiner*—David M. Schindler
(74) *Attorney, Agent, or Firm*—Drinker Biddle & Reath LLP

(57) ABSTRACT

A magnetic type angle sensor includes a rotary body having a first sensed part provided on a circumferential surface thereof with projecting parts and recessed parts at equal intervals in a circumferential direction thereof and a second sensed part provided on a circumferential surface thereof with a projecting parts at just one location, and a magnetic sensing device for sensing a change in a magnetic field along with rotation of the rotary body. The rotary body is formed with a plurality of projecting parts and recessed parts in a gear shape by gear cutting on the circumferential surface, then is cut with a groove at the center thereof in the axial direction thereof and has all projecting parts in a half section in the axial direction thereof cut off except for one.

1 Claim, 4 Drawing Sheets

| | FOREIGN PATENT DOCUMENTS | | | JP | 2002-310725 | 10/2002 |
|---|---|---|---|---|---|---|
| JP | 01050910 A | * | 2/1989 | | | |
| JP | 02017411 A | * | 1/1990 | | | |
| JP | 4-335111 | | 11/1992 | | | |
| JP | 63035705 A | | 2/1998 | | | |
| JP | 11-153451 | | 6/1999 | | | |

OTHER PUBLICATIONS

Japanese Notice of Reasons for Rejection mailed Nov. 20, 2007 issued in Japanese Application No. 2004-186276 (including a partial translation thereof).

* cited by examiner

ONE-ROTATION SIGNAL (ORIGIN SIGNAL)

ANGLE SENSING SIGNAL

ONE ROTATION

MAGNETIC TYPE ANGLE SENSOR

This is a divisional application of Application No. 11/156,492, filed on Jun. 21, 2005, now abandoned the entirety being incorporated by reference herein.

BACKGROUND OF THE INVENTION

1. Field of the Invention

The present invention relates to a magnetic type angle sensor using magnetism to sense a rotational angle and rotational position of a rotary shaft or other rotary member.

2. Description of the Related Art

As a magnetic type angle sensor using magnetism to sense the rotational angle of a rotary member, there is known a magnetic type encoder or the like for sensing the rotational position and rotational angle of a motor shaft, a rotary shaft driven by a motor, or another rotary member. FIGS. 1A to 1C are views for illustrating the operating principle of an angle sensor using magnetism to sense a rotational angle. A rotary body (hereinafter referred to as a "sensor ring") 1 of an angle sensor mounted on a rotary shaft, etc. is comprised of pure iron or another magnetic material and is formed in its circumferential direction with projecting parts 2 and recessed parts 3 alternately at equal intervals. In FIGS. 1A to 1C, this circular sensor ring 1 is illustrated in a linear form. A magnet 4 is arranged facing the recessed parts and projecting parts formed on the outer circumferential surface of the sensor ring 1. Further, a magnetic sensing device is arranged between the magnet 4 and the recessed and projecting outer circumferential surface of the sensor ring 1. The magnetic sensing device is provided with two magnetoresistance elements 5a and 5b changing in resistance along with the flux density passed therethrough. The magnetoresistance elements 5a and 5b are connected serially to form a series circuit, to which a voltage VCC is applied. The voltage between the two magnetoresistance elements 5a and 5b is sensed as the output voltage.

In the state of FIG. 1A, the magnetoresistance element 5a faces the recessed part 3 of the sensor ring 1, while the magnetoresistance element 5b faces a projecting part 2. As a result, since the magnetoresistance element 5b faces the projecting part 2, the magnetic flux emitted from the magnet 4 which is passes through the magnetoresistance element 5b is great, while since the magnetoresistance element 5a faces the recessed part 3, the magnetic flux which is passed through the magnetoresistance element 5a is small. As a result, the voltage between the magnetoresistance element 5a and the magnetoresistance element 5b, that is, the output voltage, becomes higher.

On the other hand, as shown in FIG. 1B, when the sensor ring 1 moves and the center position between the magnetoresistance elements 5a and 5b is aligned with the center of the recessed part 3 of the sensor ring 1, the two magnetoresistance elements 5a and 5b are evenly passed with magnetic flux from the magnet 4, the resistance values thereof become the same, and the output voltage becomes ½ of the supplied voltage VCC.

As shown in FIG. 1C, when the sensor ring 1 further moves and the magnetoresistance element 5a faces a projecting part 2 and the magnetoresistance element 5b faces a recessed part 3, the magnetoresistance element 5a becomes maximum in resistance value, while the magnetoresistance element 5b becomes minimum in resistance value. As a result, the output voltage becomes the minimum value.

Therefore, the output voltage becomes the output of a sinusoidal wave shape along with movement of the sensor ring. By processing this output signal, the rotational position of the sensor ring 1, that is, the rotational angle of the rotary shaft on which the sensor ring 1 is mounted, is sensed.

Further, in order to determine the position serving as the reference for the rotational angle (origin position), a single pulse origin signal (one-rotation signal) is made to be generated just once when the sensor ring 1 rotates one turn.

FIG. 2 is a view for illustrating the above-mentioned angle sensing signal and origin signal (one-rotation signal). The angle sensing signal is comprised of a large number of pulses generated at equal intervals over one rotation of the sensor ring (one rotation of the rotary member having the sensor ring mounted thereon). The number of these pulses is used for sensing of the rotational angle. On the other hand, the origin signal (one-rotation signal) is comprised of a single pulse output just once every rotation. The position of generation of this pulse is used as the criteria for determination of the rotational reference position of the sensor ring (rotary member having the sensor ring mounted thereon) 1.

In the prior art, as shown in FIG. 5, an angle signal generation sensor ring 20a formed in the circumferential direction with projecting parts 2 and recessed parts 3 alternately at equal intervals and a single rotation signal generation sensor ring 20b were fabricated and attached to a rotary shaft or other rotary member for sensing of the rotational angle. Note that the single rotation signal generation sensor ring 20b shown in FIG. 5 is formed on the circumferential surface thereof with a recessed part 3' at just a single location, so that it can sense the recessed part 3' by a magnetoresistance element as described above to generate a one-rotation signal.

Further, Japanese Unexamined Patent Publication No. 11-153451 discloses a magnetic type encoder using a sensor ring integrated with a one-rotation signal generator and an angle signal generator. The sensor ring used in this magnetic type encoder is formed in its circumferential direction with gear shaped recessed parts and projecting parts alternately at equal intervals. One of the projecting parts among these is formed to be shorter in the axial direction thereof to have only about half of the height of the remaining projecting parts. The top half (or bottom half) of the ring in the axial direction thereof is formed with recessed parts and projecting parts alternately at equal intervals. A rotational angle sensing signal is generated at these parts. On the other hand, the other half is formed at just one location with a recessed part. A one-rotation signal is generated at this part. Further, two magnetoresistance elements are used to generate a one-rotation signal from the difference between the outputs of the two magnetoresistance elements.

In the conventional method of separately fabricating an angle signal generation sensor ring 20a and single rotation signal generation sensor ring 20b as shown in FIG. 5 and attaching them to a rotary shaft for sensing of the rotational angle to form an angle sensor, the angle signal generation sensor ring 20a is produced by a machining method such as gear cutting, but the single rotation signal generation sensor ring 20b is produced by a machining method separate from gear cutting, that is, these are fabricated by different machining methods. Accordingly, there is the defect of an increase in the production costs. Further, as the rotary shaft of the motor, etc., has to be fit with the two sensor rings 20a and 20b, two attachment steps are involved and therefore the number of production steps is disadvantageously increased.

Further, the sensor ring integrated with the one-rotation signal generator and angle signal generator, as described in Japanese Unexamined Patent Publication No. 11-153451, eliminates the above-mentioned defects, but generation of the one-rotation signal requires two magnetoresistance elements. As a result, the cost is raised by that extent.

SUMMARY OF THE INVENTION

Therefore, an object of the present invention is to provide an angle sensor which can be produced and assembled easily and can be produced at a low cost.

The present invention provides a magnetic type angle sensor, which includes a rotary body and a magnetic sensing device arranged facing the rotary body and sensing a change in a magnetic field along with rotation of the rotary body, wherein the rotary body includes a first sensed part provided on a circumferential surface thereof with a plurality of recessed parts and projecting parts alternately at equal intervals in a circumferential direction thereof and a second sensed part provided on a circumferential surface thereof with a projecting part at only one location and wherein the first and second sensed parts are formed integrally from a single member.

In the above-mentioned magnetic type angle sensor, the first sensed part preferably has a gear shape. Further, the second sensed part is preferably formed by forming a gear shape simultaneously with the first sensed part and then removing all of the projecting parts except at one location.

Further, the rotary body is preferably comprised of a sintered metallic material having magnetism.

Since the first sensed part forming the angle signal generator and the second sensed part forming the one-rotation signal generator are formed integrally on the circumferential surface of a single member to prepare a rotary body, only a single step is needed for mounting it to the rotary shaft for sensing of the rotational angle, so that assembly becomes easy. Further, since a single magnetoresistance element is sufficient for generating the one-rotation signal, it is possible to form the sensor at a low cost.

BRIEF DESCRIPTION OF THE DRAWINGS

These and other objects, features, and advantageous of the present invention will be described in more detail below based on the preferred embodiments of the present invention with reference to the accompanying drawings, in which.

DETAILED DESCRIPTION

An embodiment of the present invention will be described below in conjunction with the drawings.

Figure 1A:
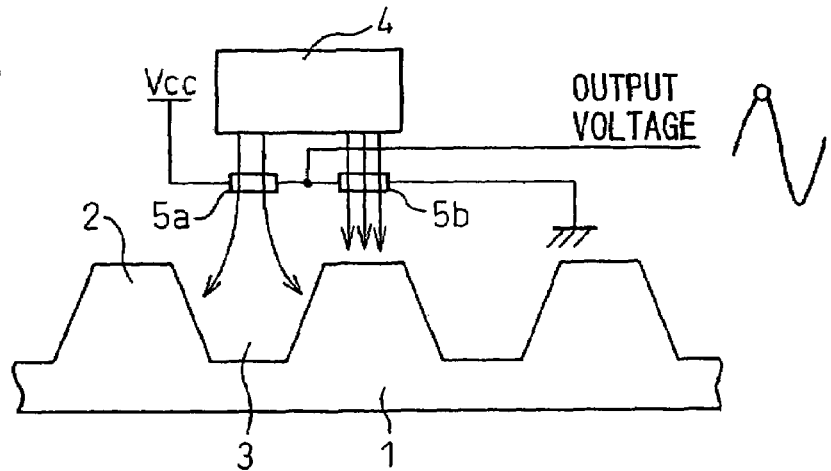
FIGS. 1A to 1C are views for illustrating the principle of a magnetic type angle sensor.
Figure 1B:
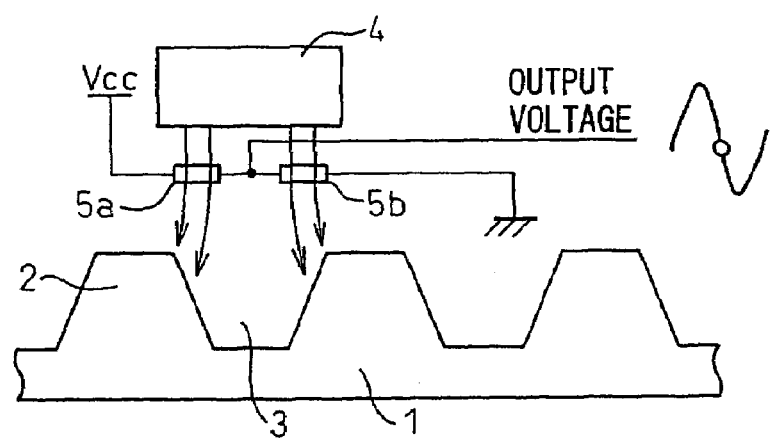
Figure 1C:
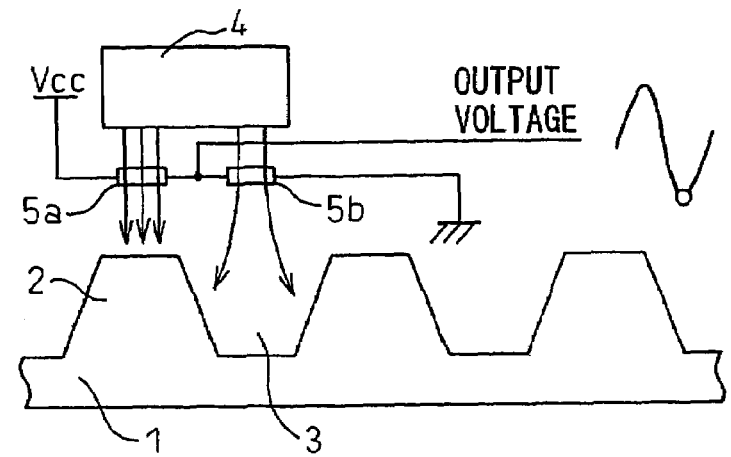
Figure 2:
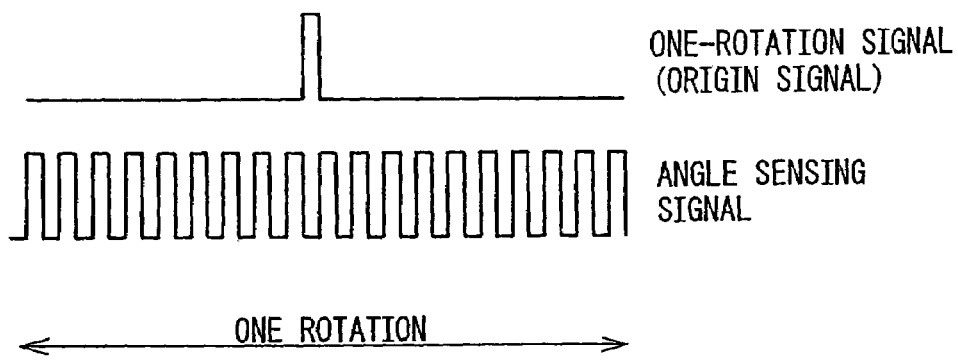
FIG. 2 is a view for illustrating an origin signal (one-rotation signal) and angle sensing signal of the magnetic type angle sensor.
Figure 3A:
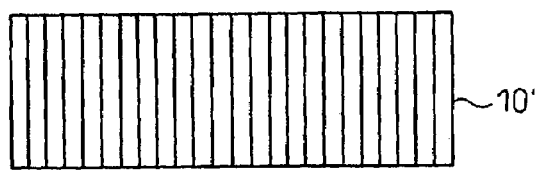
FIGS. 3A to 3C are views for illustrating a process of production of an angle sensing rotary body of a magnetic type angle sensor according to an embodiment of the present invention.
Figure 3B:
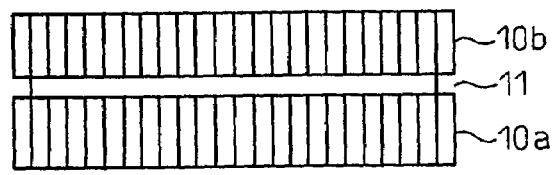
Figure 3C:
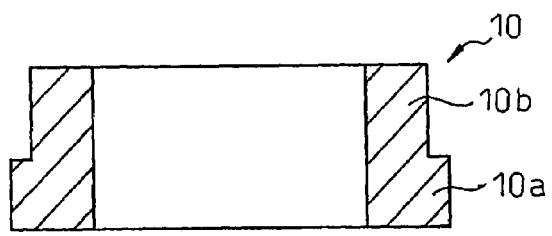

FIGS. 3A to 3C are views for illustrating a process of production of a rotary body of a magnetic type angle sensor according to an embodiment of the present invention. First, as shown in FIG. 3A, a magnetic material is used to prepare a ring 10' for forming the rotary body. This ring 10' has a thickness (length in an axial direction of the ring 10') over the sum of a thickness of an angle signal generator forming a first sensed part and a thickness of a one-rotation signal generator forming a second sensed part and is formed on an outer circumferential surface thereof with gear-shaped recessed parts and projecting parts alternately at equal intervals. The gear shape may be formed by the gear cutting of the outer circumferential surface of the ring 10'. Alternatively, the gear shape may be formed by using a sintered metal powder having magnetism as the material of the ring 10' and sintering the metal powder by means of a mold having gear-shaped recessed parts and projecting parts. In the former case, as the material of the ring 10', carbon steel or another ferrous magnetic material can be used.

Next, as shown in FIG. 3B, the boundary position between an angle signal generator 10a and a one-rotation signal generator 10b (in the example of FIGS. 3A to 3C, the center of the ring 10' in the axial direction thereof) is cut with a groove 11. The depth of the groove 11 is the same as the height of the projecting parts formed by the gear cutting or is made slightly larger than the height of the projecting parts.

After this, all of the projecting parts at the side of the ring 10' forming the one-rotation signal generator 10b are cut off except for a single projecting part 21.

Due to this, as shown in FIG. 3C, an angle signal generator 10a provided with gear-shaped recessed parts and projecting parts and a one-rotation signal generator 10b provided with only a single projecting part 21 and smooth at the rest of the circumferential surface thereof are formed, whereby a ring forming the angle sensor rotary body 10 is formed.

Figure 4:
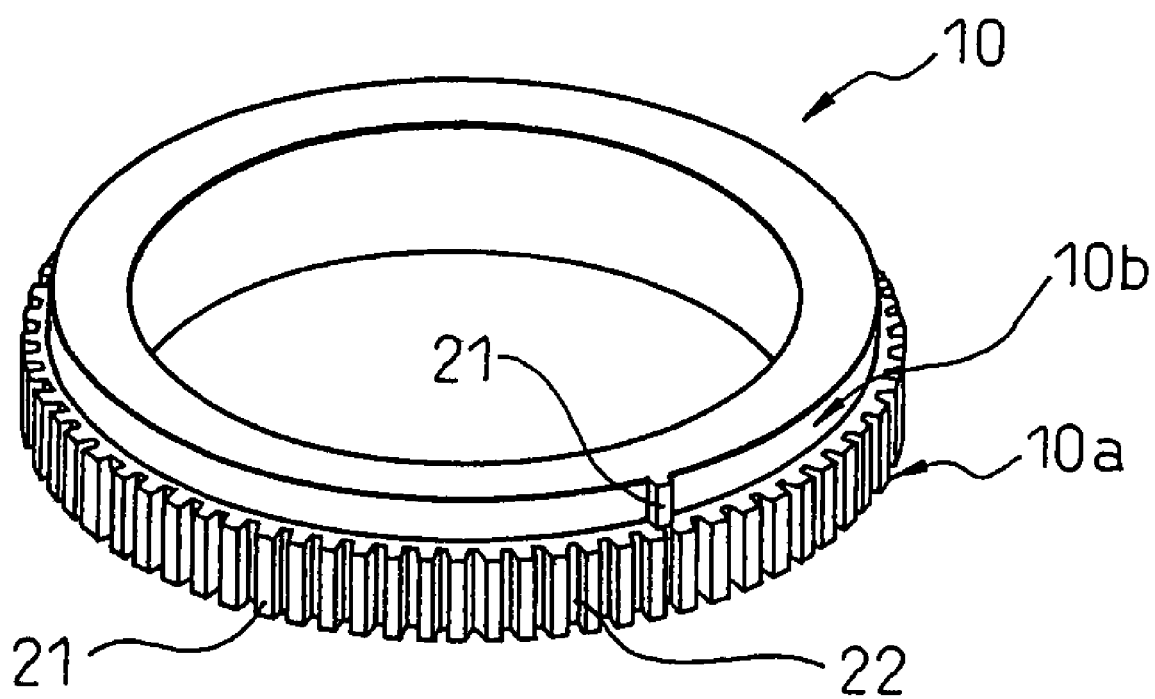
FIG. 4 is a perspective view of the angle sensing rotary body of the embodiment shown in FIG. 3.
Figure 5:
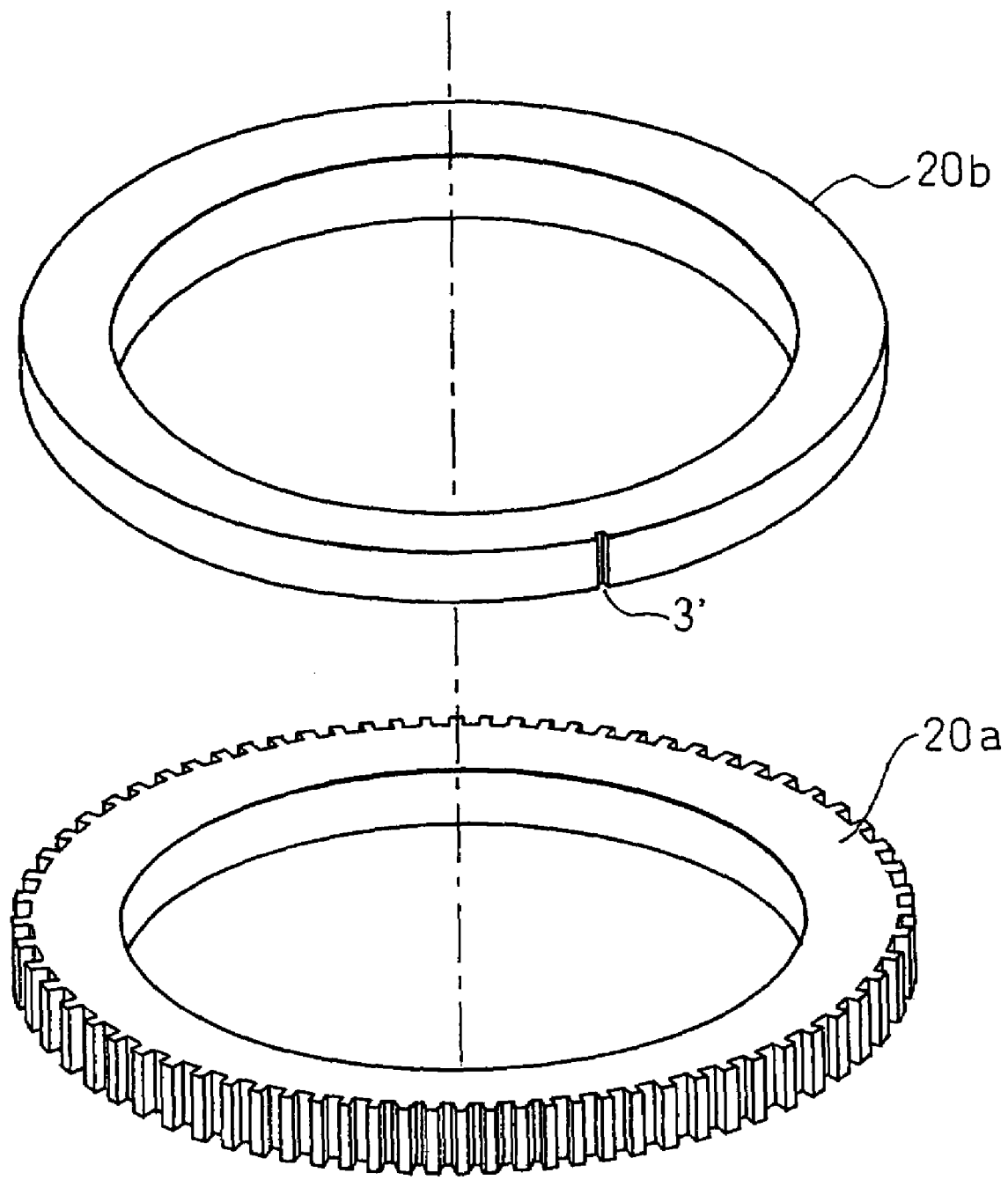
FIG. 5 is a perspective view of an angle sensing rotary body of a conventional magnetic type angle sensor.

FIG. 4 is a perspective view of the thus formed rotary body (ring) 10 of the angle sensor. The portion of the circumferential surface of the rotary body (ring) 10 forming the angle signal generator 10a is formed in a gear shape with projecting parts 21 and recessed parts 22 alternately at equal intervals, while the portion of the circumferential surface forming the one-rotation signal generator 10b is formed at only one location with a projecting part 21.

The thus formed rotary body (sensor ring) 10 is comprised of the one-rotation signal generator 10b and the angle signal generator 10a formed integrally from the same member. This makes it possible attach the rotary body 10 by a single step to the shaft of a motor for which the angle is to be sensed or another rotary shaft etc., and therefore attachment of the angle sensor to the rotary shaft or other rotary member becomes simpler. Further, in order to generate a one-rotation signal, it is sufficient to sense the only one projecting part 21 at the entire circumference of the one-rotation signal generator 10b, so a single magnetoresistance element is sufficient to generate a one-rotation signal. That is, it is sufficient to sense a change in the output of the magnetoresistance element (potential difference between two ends of the magnetoresistance element) and output a one-rotation signal.

While the present invention has been described above with reference to the specific embodiment shown in the accompanying drawings, these embodiments are only for explanatory and are not limitative. Therefore, the scope of the present invention is limited only by the claims. The preferred embodiment of the present invention can be modified or changed in any way without departing from the scope of the claims.

What is claimed is:

1. A method of producing a magnetic type angle sensor, said magnetic type angle sensor comprising a rotary body and a magnetic sensing device arranged facing said rotary body and sensing a change in a magnetic field along with rotation of said rotary body, said rotary body including a first sensed part provided on a circumferential surface thereof with a plurality of recessed parts and projecting parts alternately at equal intervals in a circumferential direction thereof and a second sensed part provided on the circumferential surface thereof with a projecting part at only one location, said method comprising the steps of:

provndg a gear-shaped member including a first portion to be formed into said first sensed part and a second portion to be formed into said second sensed part;

forming an annular groove on the circumferential surface of said gear-shaped member between said first portion and said second portion; and forming said second sensed part by removing all of the projecting parts except at one location from the second portion.

* * * * *